United States Patent [19]

Young et al.

[11] Patent Number: 5,415,058

[45] Date of Patent: May 16, 1995

[54] REMOVABLE TAILGATE LOCKING DEVICE

[76] Inventors: William M. Young, 6127 Barcelona Ct., Alta Loma, Calif. 91701; Harold Peterson, 7069 Arbor, Hesperia, Calif. 92345

[21] Appl. No.: 11,793

[22] Filed: Feb. 1, 1993

[51] Int. Cl.⁶ .......................... G05G 1/04; B60R 25/00
[52] U.S. Cl. ........................................ 74/526; 74/608; 70/237; 292/307 B; 280/507
[58] Field of Search .................. 74/526, 608; 70/237, 70/118; 292/307 B, 307 R, 307 A, 308, 324; 280/507; 296/57.1

[56] References Cited

U.S. PATENT DOCUMENTS

| | | | |
|---|---|---|---|
| 3,391,555 | 7/1968 | Mamo | 70/258 |
| 4,171,844 | 10/1979 | Landaal et al. | 296/57.1 |
| 4,459,832 | 7/1984 | Avrea et al. | 280/507 |
| 4,762,360 | 8/1988 | Huber | 296/57.1 |
| 4,819,461 | 4/1989 | Pearson | 70/237 X |
| 5,000,067 | 3/1991 | Kolbusz et al. | 280/507 X |
| 5,018,759 | 5/1991 | Villalon et al. | 280/507 |
| 5,080,418 | 1/1992 | Semple et al. | 280/757 X |
| 5,265,450 | 11/1993 | Doyle | 296/57.1 X |
| 5,836,570 | 6/1989 | Lopez et al. | 70/237 |

FOREIGN PATENT DOCUMENTS

| | | | |
|---|---|---|---|
| 2315414 | 2/1977 | France | 280/507 |
| 3612878 | 1/1987 | Germany | 296/57.1 |

Primary Examiner—Vinh T. Luong
Attorney, Agent, or Firm—Leo R. Carroll

[57] ABSTRACT

A locking device is provided for a removable tailgate on a pickup truck which permits normal rotational use of the tailgate while the lock is installed. The device is comprised of two basic parts, a lock and a lockable clamp. The clamp is used to close the open portion of the receiving cup through which the shaft is passed when the tailgate is normally removed. The clamp consists of a "b" shaped clamp with bent apertured tabs at each end. The lock mechanism includes a short linear plunger shaft with a head on the end of the shaft outboard of the lock. The diameter of the head is larger than the apertures in the end tabs of the clamp, so that the clamp is held secure.

6 Claims, 2 Drawing Sheets

REMOVABLE TAILGATE LOCKING DEVICE

BACKGROUND OF THE INVENTION

1. Technical Field

This invention relates generally to locking methods and apparatus, and in particular to a locking device to prevent theft of a removable pickup truck tailgate.

2. Background Art

Pickup truck tailgates are usually hinged at the bottom of the tailgate so as to permit rotation of the tailgate from a lockable closed vertical position to one in which the truck bed is open. In addition, such tailgates may be easily removed from the truck in order to facilitate such functions as backing up to a loading platform. Since locking means are conventionally provided to secure the tailgate in the closed position only, removable tails may be easily stolen after they are opened.

This problem has been recently addressed in several inventions. For example, Bowman, in U.S. Pat. No. 4,981,320 provides mechanical means for preventing normal removal of the side links which support a horizontal open tailgate door. Since such links are usually connected to a bolt-head type stud on the truck body through variably sized slot openings in the link, fastening means are provided which will internally occlude the larger portion of the slot opening necessary for removal of the stud head. The fastening means however, are secured to the strap by bolts or rivets. Since the former may be easily removed by owner and thief alike, and the latter with more difficulty by both, security is only obtained if the feature of a removable tailgate is given up.

In a different approach, U.S. Pat. No. 5,004,287 to Doyle discloses apparatus in which an elongated hinge-pin member may be extended from the truck body into a receiving cup located in the tailgate. An opening in the side wall of the receiving cup permits normal removal of the door. Lateral movement of lock bolt may be accomplished by either an electrical solenoid or through the rotary motion of a cylinder lock. Although the lock bolt housing, lock bolt, and lock may alternatively be mounted in the truck body with the receiving mechanism built into the tailgate, either approach requires considerable mechanical modification to both existing truck members.

A need still exists therefore, for a simple locking device which can be installed by anyone who can remove a removable tailgate from a truck without the need to alter the existing truck or tailgate design by mechanical modification.

DISCLOSURE OF INVENTION

The present invention is directed to a simple locking system which is usable on the most common types of removable tailgates being supplied on pickup trucks today. Parts for the locking assembly may be installed by the original manufacturer, or added by the truck owner without mechanical modification of any truck elements.

In the most common type of removable tailgate being currently used, the tailgate is attached to the truck body by a hinge mechanism which permits rotary motion from the vertical closed position to a horizontal position approximately level with the truck bed. The hinge mechanism consists of a pivot shaft member about which a receiving cup rides. The receiving cup is mostly round, and contains an open slotted sector of cup wall, through which the shaft may be passed for removal of the tail gate. Since the open sector must be angularly positioned beyond the angular sector necessary to provide bearing support, the shaft end is usually truncated by having a pair of parallel flats cut thereon. The cross section distance across the flats will now be less than the bearing diameter, and will permit reduction of the angular extent of the cup opening through which the shaft must be passed for removal.

In this invention, removable and lockable covering means are provided to close up the open portion of the retaining cup and to thereby prevent removal. In the most simple embodiment, the covering means consists of a clamp which may be placed around the receiving cup, in a manner similar to that of a hose clamp. Tab ends of the clamp contain apertures through which a lock bolt may be passed prior to locking. The lock portion of this invention consists of a small tumbler with a special linear plunger replacing a shackle. This special plunger has a head end with a diameter larger than that of the holes in the clamp end. When the plunger is pushed into the locked position, the larger head will securely hold the two clamp ends. Since the small lock body is positioned within the confines of the tailgate cross section, it will also serve to prevent rotation of the assembly.

With the foregoing drawbacks of the prior art in mind, it is an object of the present invention to provide an improved locking device for a removable truck tailgate which does not require mechanical modification of the truck body or tailgate.

It is another object of the invention to provide an improved locking device for a removable truck tailgate which permits normal rotational use of the tailgate while the lock is installed.

Yet another object of this invention is to provide an improved locking system for a removable truck tailgate which contains a minimum of parts.

Still other objects of the invention are to provide a removable tailgate locking system which may be inexpensively manufactured, is structurally rigid and safe, and can be easily retrofitted onto existing truck water tailgates.

The above and other objects, features and advantages of the present invention will become more apparent from the following description when making reference to the detailed description and to the accompanying sheets of drawings in which preferred structural embodiments incorporating the principals of this invention are shown.

BRIEF DESCRIPTION OF THE DRAWINGS

The details of my invention will be described in connection with the accompanying drawings, in which.

BEST MODE FOR CARRYING OUT THE INVENTION

Figure 1A:
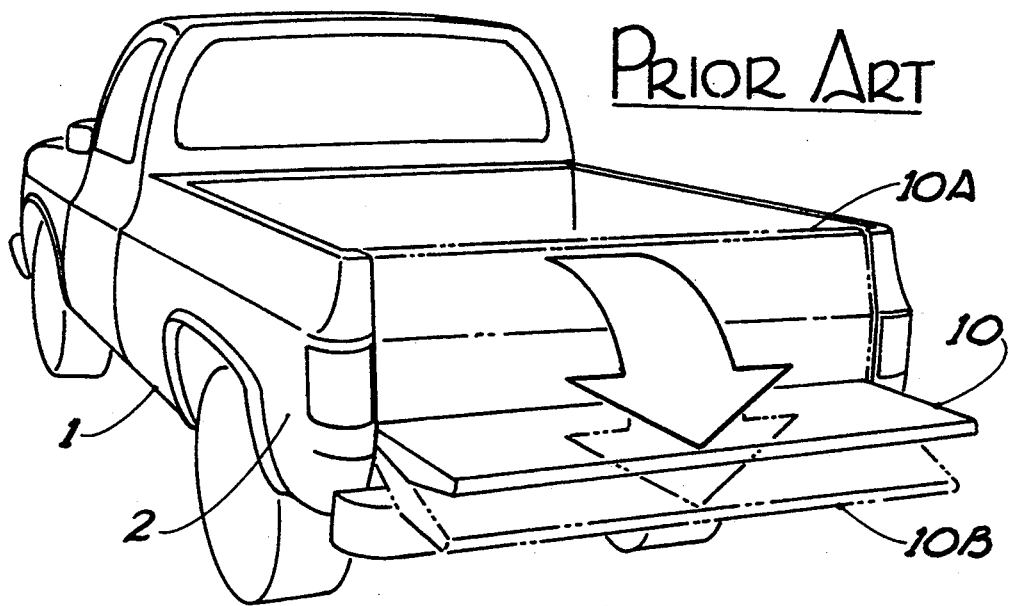
FIG. 1a depicts a typical example of a prior art pickup truck with a removable tailgate, as commonly installed in pickup trucks.

FIG. 1A depicts a typical example of a prior art pickup truck 1 having a body 2 with a removable tailgate 10 attached thereto, as commonly installed in new pickup trucks. Tailgate 10 is shown in the open position after having been rotated in the direction of the arrow from the closed position shown in phantom at position 10A. Tailgate 10 may be further rotated in the direction of the arrow to position 10B, at which point removal of the tailgate from the truck is effected. Although tailgate 10 is shown reaching its removal position 10B at an angle greater than the 90 degree open position for ease of illustration, it will be realized that actual removal angles may be less than 90 degrees, the selection being a matter of manufacturer design choice.

Figure 1B:
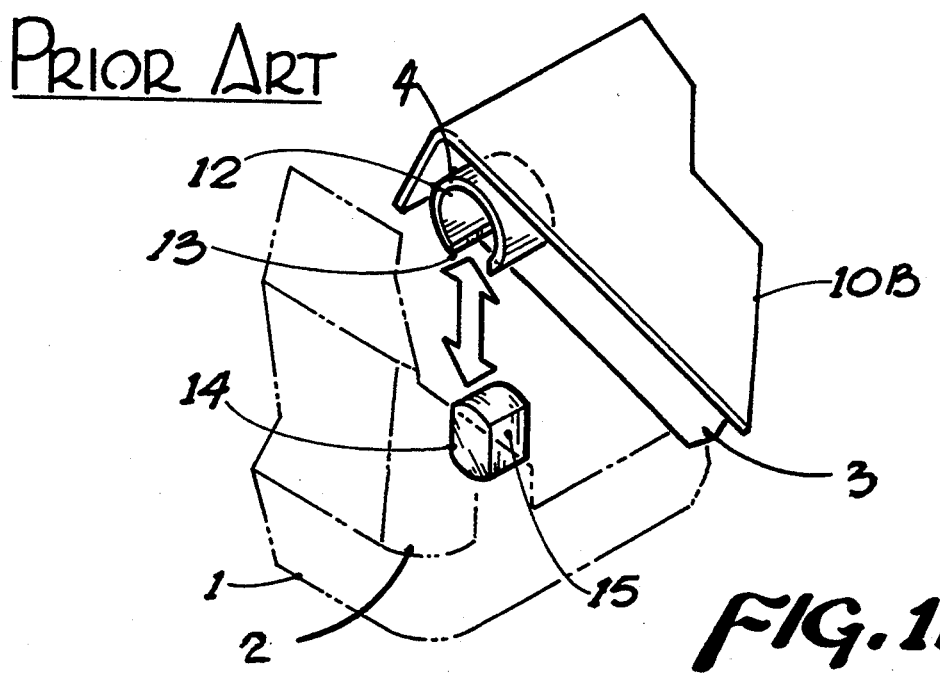
FIG. 1b shows an exploded perspective view of a prior art hinge assembly on one side of partial sections of the truck body and tailgate of FIG. 1A.

FIG. 1B shows an exploded perspective view of a prior art hinge assembly 11 on one side of a cut away tailgate at 10B. Cup 12 is firmly attached to the end side wall 3 of tailgate 10B so that when assembled, cup 12 receives and pivots around the end of shaft 14. A first open slotted sector 13 is cut in a sector of the wall 4 of cup 12 so as to permit passage of shaft 14 through the first open slotted sector 13 when the tailgate is to be removed from the truck. Pivot shaft 14 is shown with flats 15 machined on its sides so as to reduce the shaft thickness to be passed through the first open slotted sector 13 when it is aligned for removal. Although parallel flattened surfaces are common, other cross sections might be used such as an oval shape. In FIG. 1B, tailgate 10B is lifted vertically in the direction of the arrows in order to remove the tailgate.

Figure 2:
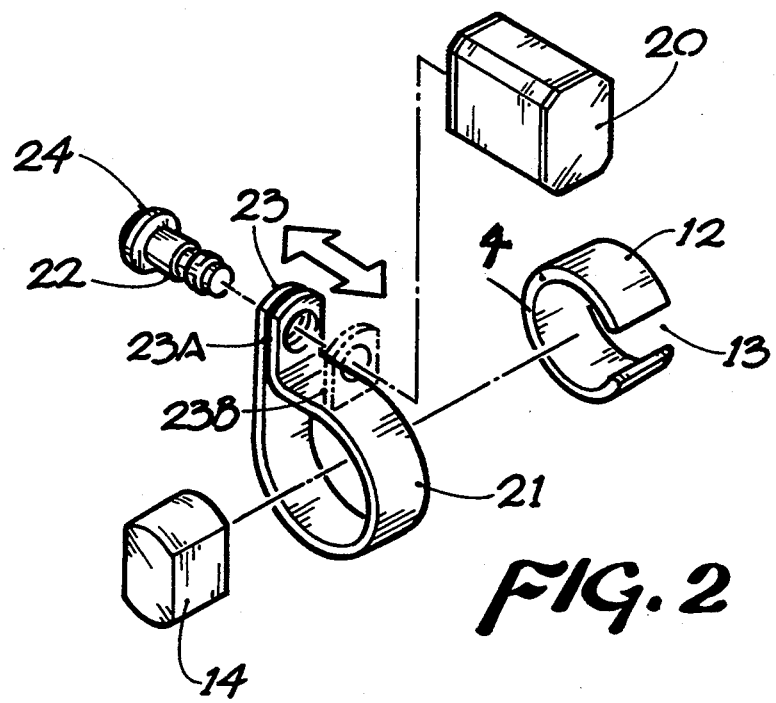
FIG. 2 shows an exploded perspective view of a primary embodiment of this invention in which a lock body, lock plunger, and clamp are depicted with the exploded prior art pivot shaft and cup of FIG. 1b.

FIG. 2 shows an exploded perspective of a primary, embodiment of this invention in which lock body 20 is depicted with an exploded linear lock plunger 22. Covering means such as clamp 21 is placed around cup 12 so as to close the first open slotted sector 13 and thereby block removal of pivot shaft 14. The clamp 21 has a "b" shaped edge configuration, with the top of the "b" comprised of the two apertured tab ends 23 of the clamp, each having second collinear apertures disposed on the plane of the tabs. Lock plunger 22 serves as a linear lock shackle and has a head end 24 having a diameter larger than that of the second apertures in the clamp ends. Clamp 21 is tightened by means of movement of the apertured tab ends 23 from the open position shown in phantom at 23B toward each other in the direction of the arrow, so that the tab ends are positioned closed at 23A between the body of lock 20 and head 24 of plunger 22. When locked, lock plunger 22 is pushed through the apertures in tabs 25 into lock body 20, thereby restraining damp 21 by means of head 24. Not shown are conventional locking details such as keys, combinations, or tumbler mechanisms.

Figure 3:
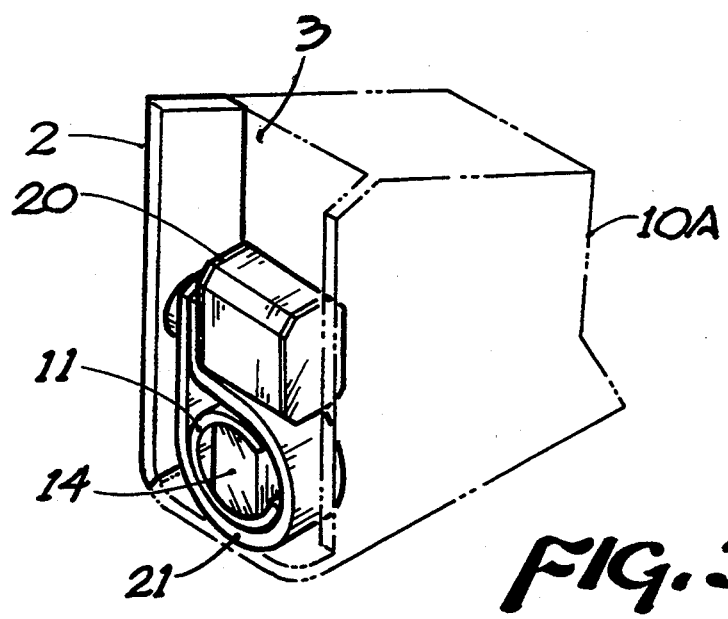
FIG. 3 presents a perspective view of the positioning of the locked assembly of FIG. 2 within a sectioned end edge of the tailgate.

FIG. 3 illustrates the positioning of the locked assembly of FIG. 2 within the end side wall 3 of tailgate 10, and shows the complete clamped closure of the first open slotted sector 13, Lock body 20 is sized to fit above hinge mechanism 11 and within the side wall 3 span of tailgate 10. In FIG. 3, side wall 3 is shown recessed as in a typical tailgate, and the span is defined as the distance between the overhanging flange of one surface of the tailgate 10 and a portion of the truck body 2. Alternate tailgate designs can have flanges overhanging from both surfaces of the tailgate. Any tendency to the lock assembly to rotate relative to the closed tailgate will be arrested by the confines of the tailgate edge in either case. The lock mechanism will be seen to rotate with the tailgate as it is opened and closed. Under normal usage therefor, the tailgate will always be secured against theft. Removability will be available however, for those fewer instances when the tailgate must be removed.

What is claimed is:

1. In combination with a pickup truck having a track body and a tailgate mounted on the truck body, said tailgate being attached to said truck body by a hinge mechanism having a rotational axis, such hinge mechanism comprising a shaft member with a pair of parallel flats cut thereon, said shaft member connected to a cup for rotation of the shaft member within the cup, said receiving cup having a wall containing a first open slotted sector in the cup wall for passage of the parallel flat portion of said shaft therethrough, whereby said tailgate may be installed or removed from said truck body, a locking device comprising:

means for covering the first open slotted sector in the receiving cup wall so as to prevent removal of the shaft member through the first open slotted sector in the receiving cup wall; and lock means for securing said covering means to said receiving cup wall when locked.

2. The combination as recited in claim 1, in which said covering means comprises a "b" shaped clamp having a second open slotted sector in the clamp wall through which said sleeve may be positioned around the receiving cup wall, said clamp further having bent tab portions at each end of said clamp, each said tab defining an apertured area therein whereby moving said apertured areas toward each other results in closure of the first open slot sector of the receiving cup wall so as to prevent removal of the shaft.

3. The combination as recited in claim 2, in which said locking means further comprises:

a lock plunger for passage through said apertured areas in said clamp tab ends, said lock plunger further having a first inward end, and a second outward end having a head thereon to clamp said tap ends when said lock is closed; and a lock body supporting said inward end of said lock plunger and containing means for linear extension and contraction of said lock plunger.

4. The combination as recited in claim 3 wherein said lock mechanism is positioned adjacent to and above said hinge mechanism so that said lock mechanism will rotate with said tailgate.

5. In combination with a pickup truck having a truck body and a tailgate mounted on the truck body, such tailgate being attached to said truck body by a hinge mechanism having a rotational axis, such hinge mechanism comprising a shaft member connected to a receiving cup for engagement of the shaft member within the receiving cup through a first open slotted sector in a receiving cup wall, such hinge mechanism allowing rotation of the tailgate about the axis of the hinge mechanism, a locking device comprising:

a clamp having tab portions at each end of said clamp defining a second opening therebetween sufficient to permit coaxial disposition around said receiving cup, each said tab defining an apertured area thereon whereby moving said apertured areas toward each other results in closure of the first open slot sector of the receiving cup wall to prevent removal of the shaft member through the first open slotted sector in the receiving cup wall;

a lock body mounted on said clamp, said lock body having means for securing a lock plunger when closed and for releasing said plunger when opened; and a lock plunger releasably supported by the lock body and disposed through both said apertured areas in said damp tab ends, said lock plunger further having a first inward portion connected to said lock body for securing and releasing said lock plunger, and a second outward end having a head thereon of diameter sufficiently large to restrain said clamp tab ends against said lock body when said lock is closed.

6. The combination as recited in claim 5 wherein said lock body is positioned adjacent to and above said hinge mechanism so that said lock body and lock shaft will rotate with said tailgate.

* * * * *